United States Patent
Bojiuc

(10) Patent No.: US 8,074,922 B2
(45) Date of Patent: Dec. 13, 2011

(54) DISCOIDAL FLYING CRAFT

(76) Inventor: Dumitru Bojiuc, Marina Del Ray, CA (US)

( * ) Notice: Subject to any disclaimer, the term of this patent is extended or adjusted under 35 U.S.C. 154(b) by 554 days.

(21) Appl. No.: 12/221,994

(22) Filed: Aug. 8, 2008

(65) Prior Publication Data

US 2010/0001143 A1    Jan. 7, 2010

Related U.S. Application Data

(63) Continuation-in-part of application No. 11/210,035, filed on Aug. 22, 2005, now abandoned.

(51) Int. Cl.
*B64C 27/20* (2006.01)
*B64C 39/00* (2006.01)

(52) U.S. Cl. ............. 244/53 R; 310/90.5; 310/114; 310/266; 310/184; 244/23 C

(58) Field of Classification Search .......... 310/114, 310/113, 180, 184, 266, 268, 90.5; 244/12.2, 244/23 C, 53 R
See application file for complete search history.

(56) References Cited

U.S. PATENT DOCUMENTS

| | | | |
|---|---|---|---|
| 3,437,290 A * | 4/1969 | Norman .......... | 244/12.2 |
| 3,480,811 A * | 11/1969 | Grosbard ........ | 310/156.38 |
| 3,997,131 A * | 12/1976 | Kling ............. | 244/23 R |
| 4,459,501 A | 7/1984 | Fawzy | |
| 4,565,938 A | 1/1986 | Fawzy | |
| 4,623,809 A | 11/1986 | Westley | |
| 4,807,830 A * | 2/1989 | Horton ........... | 244/12.2 |
| 5,191,255 A | 3/1993 | Kloosterhouse et al. | |
| 5,337,030 A | 8/1994 | Mohler | |
| 5,731,645 A * | 3/1998 | Clifton et al. ..... | 310/74 |
| 6,118,193 A * | 9/2000 | Morris ............ | 310/74 |
| 6,153,959 A * | 11/2000 | Lorenzo .......... | 310/162 |
| 6,507,257 B2 | 1/2003 | Mohler | |
| 6,575,401 B1 * | 6/2003 | Carver ........... | 244/12.2 |
| 6,803,691 B2 | 10/2004 | Rose | |
| 7,032,859 B2 * | 4/2006 | Mohr ............. | 244/12.2 |
| 7,410,123 B2 * | 8/2008 | Nunnally ........ | 244/23 C |
| 7,825,554 B2 * | 11/2010 | Bastian et al. ... | 310/74 |
| 2002/0135263 A1 * | 9/2002 | Neal .............. | 310/254 |
| 2004/0135452 A1 * | 7/2004 | Tu et al. .......... | 310/156.32 |
| 2005/0082421 A1 * | 4/2005 | Perlo et al. ...... | 244/12.2 |
| 2007/0252033 A1 * | 11/2007 | Bojiuc ........... | 244/62 |

* cited by examiner

*Primary Examiner* — Burton Mullins
(74) *Attorney, Agent, or Firm* — Gene Scott; Patent Law & Venture Group

(57) ABSTRACT

A flying craft has an aerodynamic aircraft fuselage structure preferably disc shaped. A pair of coaxial electrokinetic motor-generators are mounted concentrically, and preferably centered within the disc shaped structure of the craft. Each of the motors is toroidal in configuration, providing a ring-shaped stator and rotor portions. The rotor portions of the motors drive counter rotating fans which are electro-magnetically levitated. The structure is open to the fans so that air may be drawn into the structure and expelled downward providing vertical lift to the aircraft. By use of auxiliary air braking flaps and electrokinetic thrusters, the craft may be tilted so as to develop a desired horizontal thrust. By impulse breaking one of the fans through tracking solenoids at different points around the stator, the aircraft may be made to rotate about its own vertical axis for changing direction. By a series of sudden braking of the motors the craft may be made to move by inertial reaction.

4 Claims, 7 Drawing Sheets

US 8,074,922 B2

DISCOIDAL FLYING CRAFT

CROSS-REFERENCE TO RELATED APPLICATIONS

This is a continuation-in-part application of U.S. patent application Ser. No. 11/210,035, filed on Aug. 22, 2005 now abandoned which is herewith and which is incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

Field of the Present Disclosure

This disclosure relates generally to electric motor-generators and more particularly to a DC rotating electromagnetic machine operating by induction as a flying craft.
Description of Related Art including information disclosed under 37 CFR 1.97 and 1.98
Tu et al, US 2004/0135452, discloses a flat rotary electric generator that includes at least one toroidal coil structure for cutting magnetic lines to induce a current and at least one disc-shaped magnetic pole structure oriented parallel to the helical coil structure. If multiple toroidal coil structures and disc-shaped magnetic coil structures are included, the toroidal coil structures and disc-shaped magnetic coil structures are arranged in alternating manner. The toroidal coil structure and disc-shaped magnetic pole structure are not provided with a permeable material. When either the toroidal coil structures or the at least one disc-shaped magnetic pole structure is rotated by an external force, the toroidal coil structure cuts the magnetic lines passing therethrough to generate an induced current. Neal, US 2002/0135263, discloses a plurality of stator arc segments that form a toroidal core for a stator assembly used to make a motor. In a preferred embodiment, a plurality of magnetic fields is created when electrical current is conducted through wire wound around poles on the toroidal core. A monolithic body of phase change material substantially encapsulates the conductors and holds the stator arc segments in contact with each other in the toroidal core. Hard disc drives using the motor, and methods of constructing the motor and hard disc drives are also disclosed. Rose, U.S. Pat. No. 6,803,691, discloses an electrical machine that comprises a magnetically permeable ring-shaped core centered on an axis of rotation and having two axially-opposite sides. Coils are wound toroidally about the core and disposed sequentially along the circumferential direction. Each coil includes two side legs extending radially alongside respectively sides of the core. Coil-free spaces exist between adjacent side legs. A bracket has first and second side flanges that are connected by a bridging structure and respectively abut the first and second sides of the coil. Mohler, U.S. Pat. No. 6,507,257, discloses a bi-directional latching actuator that is comprised of an output shaft with one or more rotors fixedly mounted thereon. The shaft and rotor are mounted for rotation in a magnetically conductive housing having a cylindrical coil mounted therein and is closed by conductive end caps. The end caps have stator pole pieces mounted thereon. In one embodiment, the rotor has at least two oppositely magnetized permanent magnets which are asymmetrically mounted, i.e., they are adjacent at one side and separated by a non-magnetic void on the other side. The stator pole piece has asymmetric flux conductivity and in one embodiment is axially thicker than the remaining portion of the pole piece. An abutment prevents the rotor from swinging to the neutral position (where the rotor magnets are axially aligned with the higher conductivity portion of the pole piece). Thus, the rotor is magnetically latched in one of two positions being drawn towards the neutral position. Energization of the coil with an opposite polarity current causes the rotor to rotate towards its opposite latching position whereupon it is magnetically latched in that position. Mohler, U.S. Pat. No. 5,337,030, discloses a permanent magnet brushless torque actuator that is comprised of an electromagnetic core capable of generating an elongated toroidally shaped magnet flux field when energized. Outside the generally cylindrical coil is an outer housing with upper and lower end plates at each end. Mounted to the end plates and extending towards each other are stator pole pieces separated from its opposing pole piece by an air gap. A permanent magnet rotor is disposed in the air gap and mounted on a shaft which in turn is rotatably mounted in each of the end plates. The permanent magnet rotor comprises at least two permanent magnets, each covering an arcuate portion of the rotor and having opposite polarities. Energization of the coil with current in one direction magnetizes the pole pieces such that each of the two pole pieces attracts one of the magnets of the rotor and repels the other magnet of the rotor resulting in a torque generated by the output shaft. Reversal of the current flow results in a reversal of the torque and rotation of the rotor in the opposite direction. Preferred embodiments are disclosed having multiple cells, i.e. a plurality of stator rotor stator combinations and/or cells in which there are a plurality of pole pieces at each stator pole plane. Kloosterhouse et al, U.S. Pat. No. 5,191,255, discloses an electromagnetic motor that includes a rotor having a plurality of magnets mounted along a perimeter of the rotor. Preferably, adjacent magnets have opposite poles facing outward. One or more electromagnets are disposed adjacent to the perimeter of the rotor so that as the rotor rotates, the magnets mounted on the rotor are carried near the poles of the electromagnets. Current is supplied to the electromagnets by a drive circuit in a predetermined phase relationship with the rotation of the rotor such that, for substantially all angular positions of the rotor, magnetic attraction and repulsion between the poles of the electromagnets and the magnets mounted on the rotor urge the rotor to rotate in a desired direction. Reflective material is mounted on the rotor in predetermined angular positions. The drive circuit includes a photosensitive device which produces a signal whose value varies according to whether the device is receiving light reflected from the reflective material. The signal is amplified to produce drive current for the electromagnets. Westley, U.S. Pat. No. 4,623,809, discloses a stepper motor housing a pole structure in which a pair of identical stator plates, each having a plurality of poles, are positioned back to back with the poles projecting in opposite directions, the stator plates being positioned between a pair of substantially identical stator cups, each stator cup having a plurality of poles projecting inwardly from a back wall with a peripheral side wall terminating in an outwardly extending flange. A major surface of each flange is in contact with a face on one of the stator plates so as to assure a low reluctance magnetic path. Fawzy, U.S. Pat. No. 4,565,938, discloses an electromechanical device which can be used as a motor or as a generator. The device has a housing, including bearing means to support a rotatable shaft. Disc magnet means are provided, and poled to have alternating polarity and are mounted on the shaft to define a rotor. The device includes at least one first pole shoe in contact with the magnet means, having a portion extending radially therefrom to define a virtual pole chamber, of a first polarity. Also included is at least one second pole shoe in contact with the magnet and having a portion extending radially therefrom to define a virtual pole chamber of the other polarity. A toroid stator is mounted on the housing and has windings thereon. The stator is positioned annularly around the disc magnets such that the virtual pole chambers of the first and second pole shoes surround portions of said windings with circumferentially alternating fields of alternating polarity. Means are provided for electrical contact with the stator to draw off current when the device is operated as a generator, or provide current to operate the device as a motor. Fawzy, U.S. Pat. No. 4,459,501, discloses an electromechanical device which can be used as a motor or as a generator that has a housing, including bearing means to support a rotatable shaft. A pair of disc magnets are poled to have opposite polarity on the two faces of each. The magnets are mounted face to face together on the shaft to define a rotor. The device includes at least one first pole shoe in contact with one face of each magnet, and having a portion extending radially therefrom to define, in its preferred form, a pair of virtual pole chambers, of the same polarity as said one face. Also included is at least one second pole shoe in contact with the other face of each magnet and having a portion extending radially therefrom to define in its preferred form a pair of virtual pole chambers of the same polarity as the other face. A toroidal stator is mounted on the housing and has windings thereon. The stator is positioned annularly around the disc magnets such that the virtual pole chambers of the first and second pole shoes surround portions of said windings with circumferentially alternating fields of alternating polarity. Means for electrical contact with the stator draw off current when the device is operated as a generator, or provide current to operate the device as a motor. Kling, U.S. Pat. No. 3,997,131, discloses a rotor arrangement for an aircraft comprising two coaxially counter-rotatable rotators, each rotor being journaled freely rotatable about an imaginary axis of rotation common to both rotors on or through a fuselage part or a support member, each fuselage part or support member being either rigidly connected to or journaled on the fuselage. Each rotor together with the other respective rotor or with the component part of the support member or fuselage part supporting the first mentioned rotor constituting an integral part of an electromotor by forming the counteracting parts of the electromotor ("rotor" and "stator") which rotate relative to one another by securing a plurality of poles of the electromotor to the respective rotor and by arranging on the other counter-rotating rotor or on the component part of the support member or fuselage part supporting the first mentioned rotor the corresponding poles of the electromotor facing toward the poles of the respective rotor such that a reciprocal field effect exists, at least the poles provided on one rotor or on the respective part of the support member or fuselage part being electrically connected to a current generator which produces a frequency current. Norman, U.S. Pat. No. 3,437,290, discloses a vertical lift aircraft powered by reaction motors, the motors located near the periphery of the fan blades and the blades being supported by a peripheral ring which is supported by an air and magnetic bearing, in turn supported by an outer fuselage, which in turn is supported by a central support which also holds a passenger cabin. Finally, Carrington, U.S. Pat. No. 5,072,892 discloses an aerodynamic vehicle including a central body with a vertical axis, an outer wall and a bottom wall, a first rotatable disk concentric with the central body axis and rotatable in a first direction, a second rotatable disk concentric with the central body axis and rotatable in a second direction opposing the first direction, first and second blade members respectively mounted in the first and second disks draw fluid radially inward and vertically downward to compress the fluid into a funnel-shaped fluid passageway. Selectively vectorable nozzle members are in communication with the passageway for discharging the compressed fluid below the central body to provide lift for the aerodynamic vehicle. Jet engines are mounted on the device for providing additional thrust and for generating hydraulic and electric power for the vehicle control system.

Our prior art search with abstracts described above teaches rotating electromagnet machines; in both motor and generator forms. Thus, the prior art shows in Neal, a toroidal core with radial arc segments, in Fawzy, we see a N-N and S-S pole face adjacency, in Tu et al, a N-S and S-N pole adjacency with radial coil windings, in Rose, we find radially wound coils in sequence around a toroidal core and with permanent magnet segments with N-N and S-S adjacency. However, the prior art fails to teach a rotating electromagnetic machine using pulsed direct current for providing solenoid operation in a rotor by induced currents and magnetically levitated fan blades operable in a flying craft.

BRIEF SUMMARY OF THE INVENTION

This disclosure teaches certain benefits in construction and use which give rise to the objectives described below.

A flying discoidal rotorcraft is equipped with a double counter rotated pulsed DC linear-toroidal electric motor-generator combined with a magnetically levitated suspension of the rotorcraft body over the propulsion assembly. The inner and outer portions of fan blades are made up of electro-active-magnetic levitation & guidance pilot solenoids as the fixed portion of the stator's assembly and electrokinetic motor-generator and also the attached part of the craft's body. The mobile portion has double independent counter rotated ferromagnetic cores, wherein rotors of the electrokinetic motor-generator have three main components: electromagnets or solenoids including in their functions external and internal electromagnetic & guidance solenoids with energy collector and inductor components; electric motor-generator solenoid coils; and ring propellers.

A primary objective inherent in the above described apparatus and method of use is to provide advantages not taught by the prior art.

Another objective is to provide a rotating wing craft with internal fans capable of developing a generally vertically oriented propulsion force.

A further objective is to provide such a craft capable of horizontal flight using only the rotating internal fans.

A further objective is to provide such a craft capable of developing operational thrust in a vacuum using only the rotating fans.

Other features and advantages of the present invention will become apparent from the following more detailed description, taken in conjunction with the accompanying drawings, which illustrates, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention. In such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
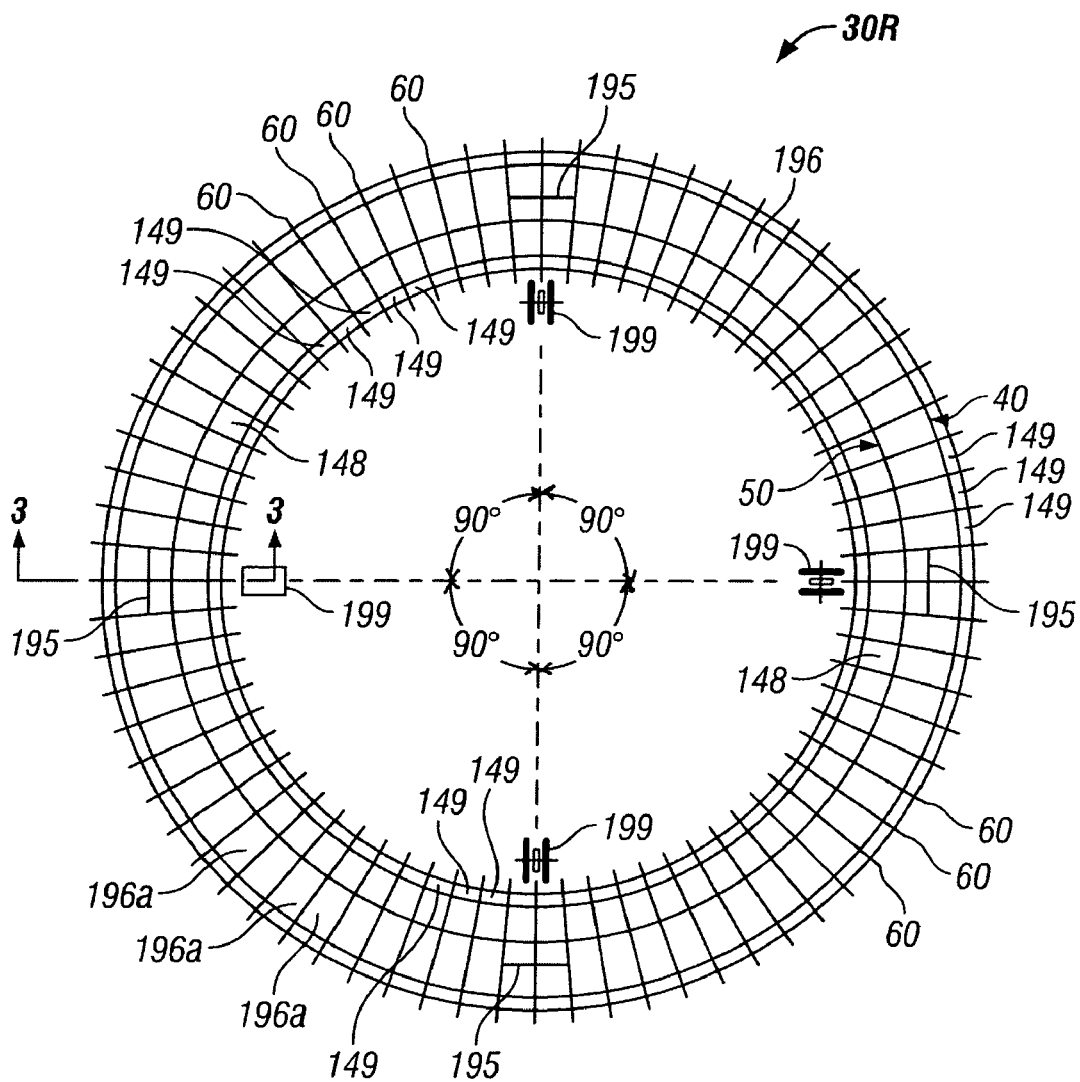
FIG. 1 is a schematic plan view of the presently described apparatus showing locations of solenoids, fan blades, directional flaps, and directional thrusters thereof.
Figure 2:
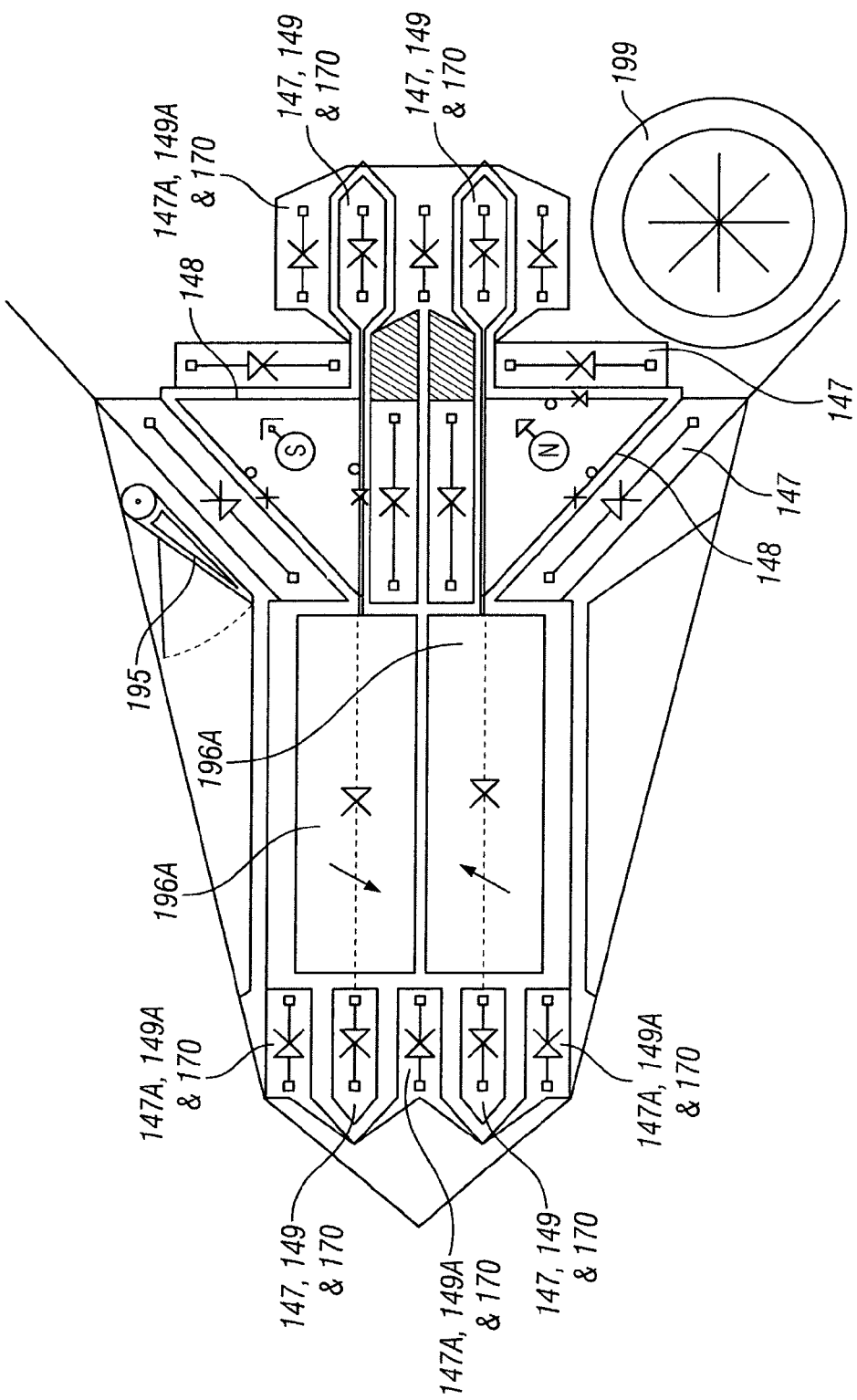
FIG. 2 is a schematic diagram of a partial vertical cross-section taken along section line 3-3 in FIG. 1 with components of the invention shown in their relative physical positions.
Figure 3:
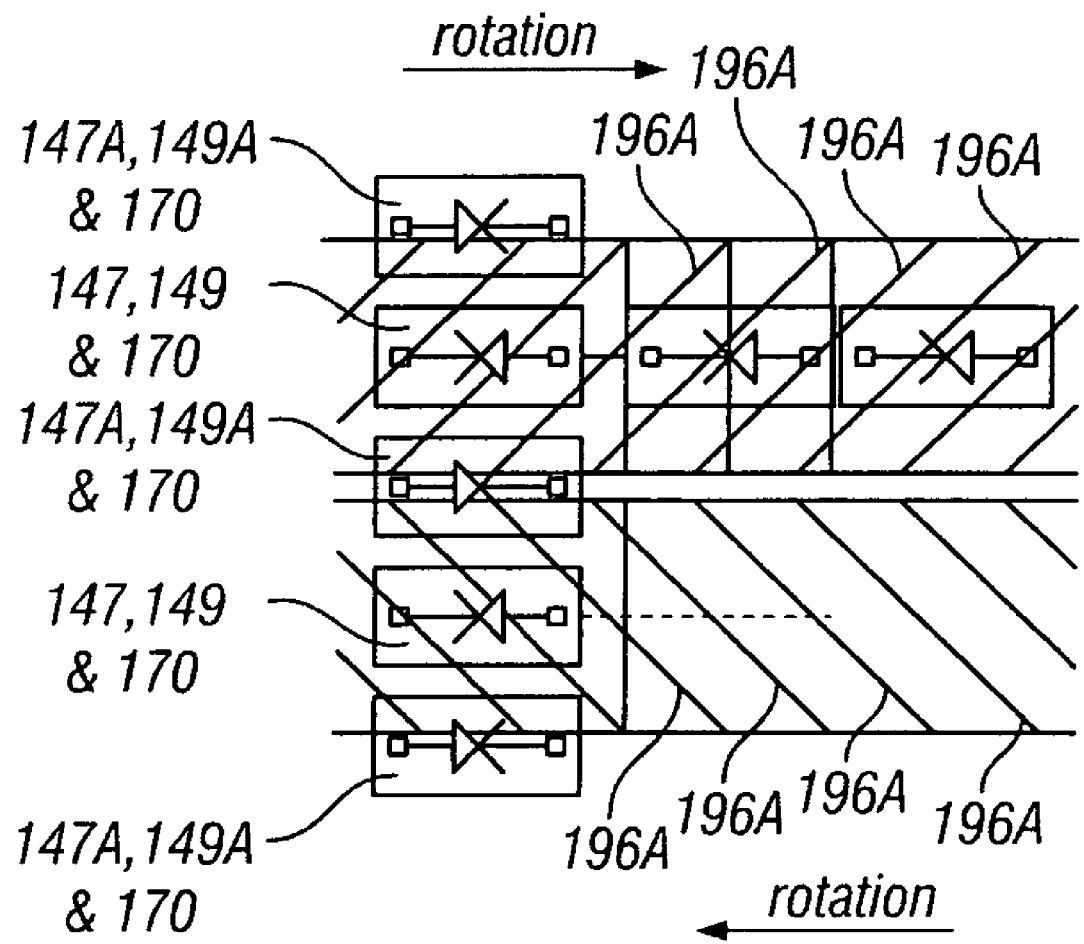
FIG. 3 is a schematic diagram of a partial vertical cross-section taken along line 4-4 in FIG. 5.

The present invention apparatus is described now as a flying craft 10 which has an aerodynamic fuselage structure preferably disc shaped. Referring now to FIGS. 2 and 6 which shows, in section, one radial portion of a plurality of coaxial electric motors 20 which are mounted concentrically, and preferably centered within the disc shaped structure of flying craft 10. Motors 20 are toroidal in configuration, each providing a ring-shaped stator portion 30S (FIG. 4), and a ring shaped rotor portion 30R, also shown in FIG. 4, and best shown in FIG. 1. Each of the rotor portions 30R comprise a fan made up of a full circle of radial fan blades 196A extensive between an outer circumference 40 and an inner circumference 50 (FIG.1). Each of the blades 196A is secured to ferromagnetic toroidal rotor ring 148. Each ring 148 is triangular in cross-section (FIG. 4), and provides a plurality of triangular radial slots 148A spaced apart around the ring 148. In each of the slots 148A, a tractor coil 148B is secured and is in series connection with rotor levitation solenoids 149 as shown in FIG. 5 at the root and tip of blades 196A.

Figure 4:
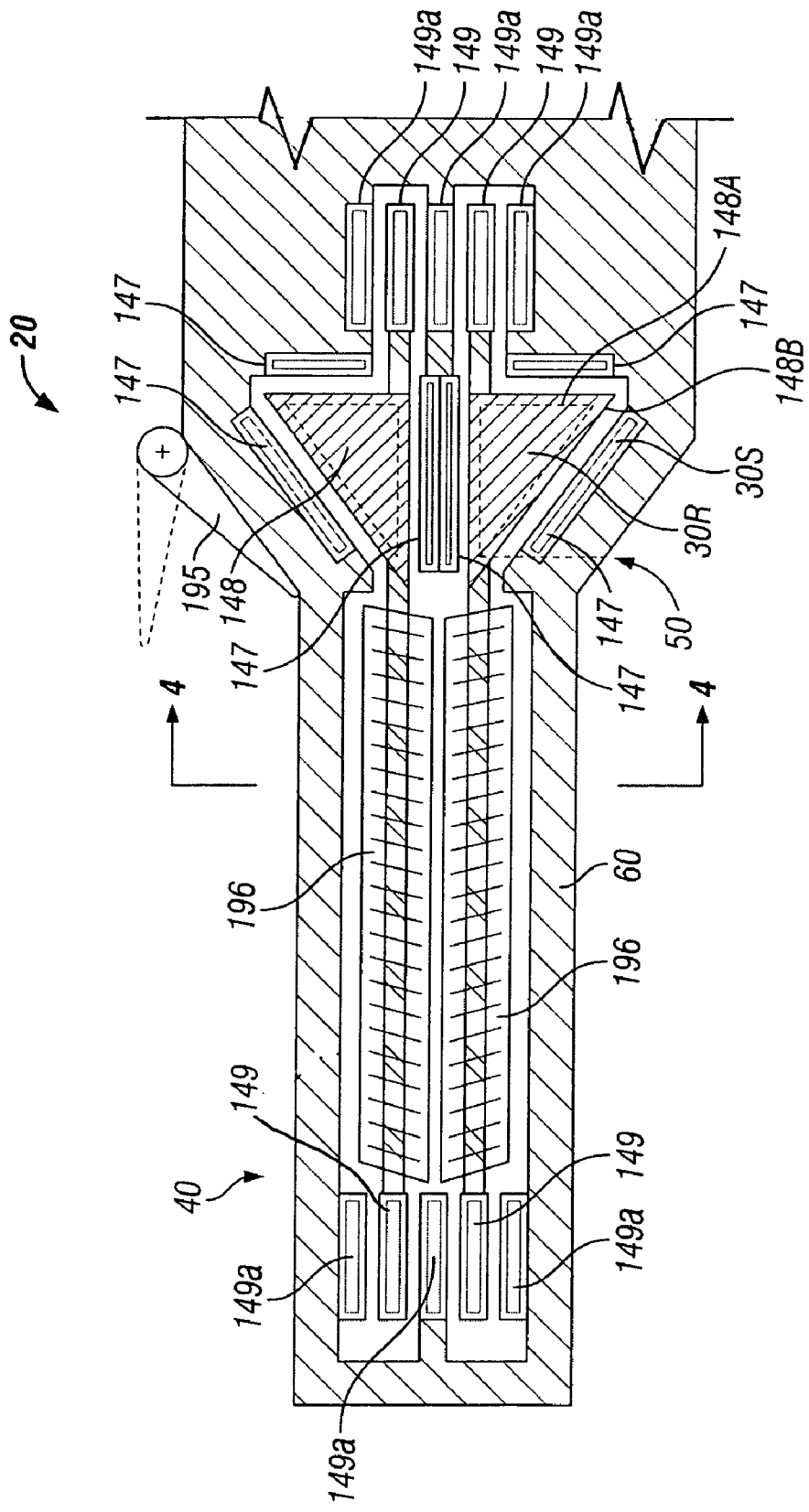
FIG. 4 is a mechanical schematic diagram, showing physical placement and relationships between components of the invention, and is shown as a vertical cross-section taken along line 3-3 in FIG. 1.

The stator portion 30S provides a plurality of radially oriented struts 60, shown schematically as radial lines in FIG. 1 and in section in FIG. 4. Struts 60 support stator levitation solenoids 149A, which are arranged in close proximity to the rotor levitation solenoids 149 as shown in FIGS. 2 and 4. The cores of solenoids 149 and 149A are preferably permanent magnets so that rotor portions 30R are magnetically supported and spaced apart from stator portions 30S even when electrical current is not present.

The struts 60 further support a plurality of sets of tractor solenoids 147, preferably three solenoids per set; the sets 147 arranged in spaced apart locations, each in close proximity to each one of the tractor coils 148B. Between each pair of individual corresponding adjacent tractor solenoids of respective adjacent sets of the tractor solenoids 147 is positioned a control electromagnet 147A as shown schematically in FIG. 5. The control electromagnets 147A operate to control magnetic end effects of the tractor solenoids 147, which end effect is developed in the gap between adjacent tractor solenoids 147.

Figure 5:
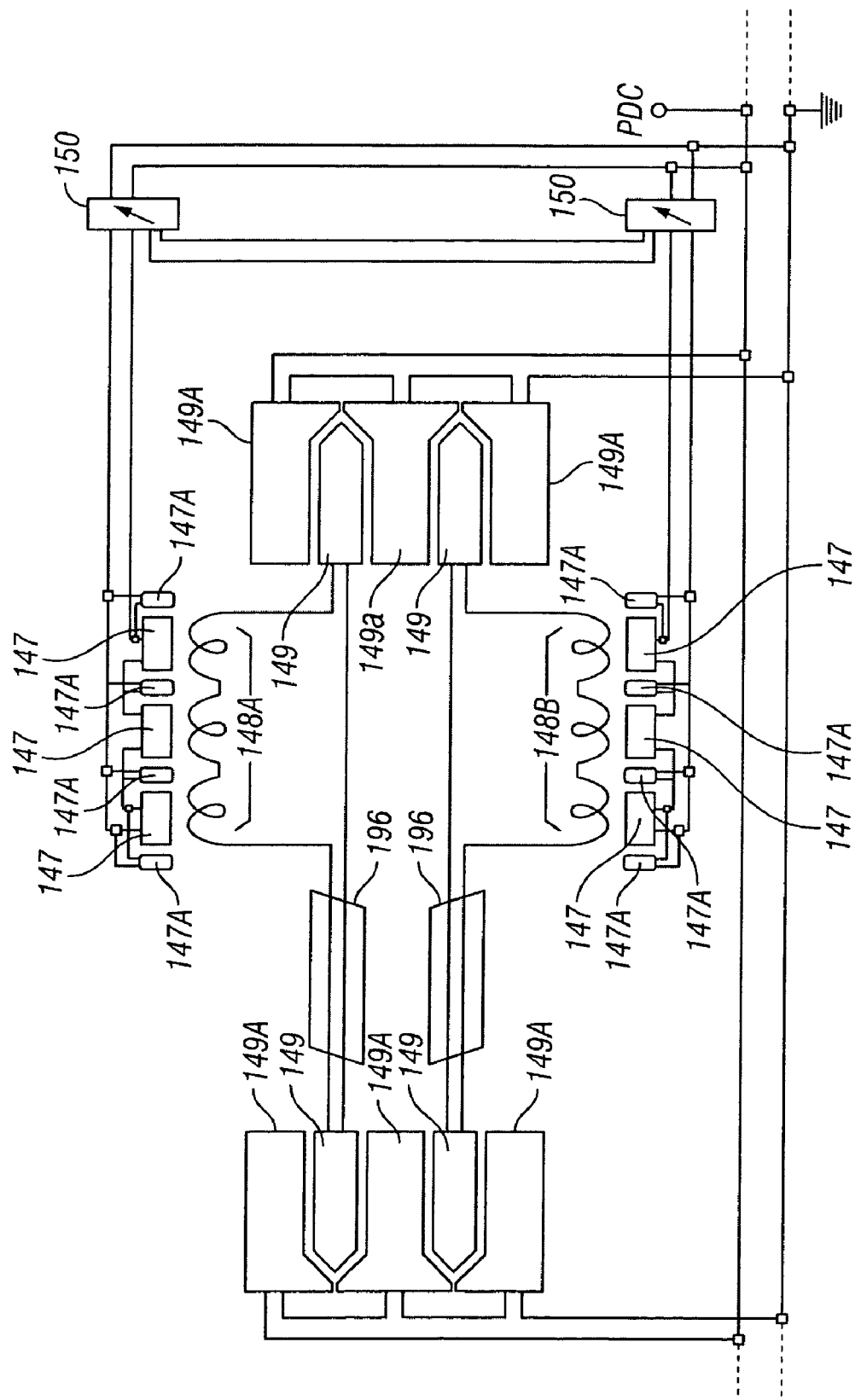
FIG. 5 is an electrical schematic diagram of components shown in FIGS. 2 and 4.
Figure 6:
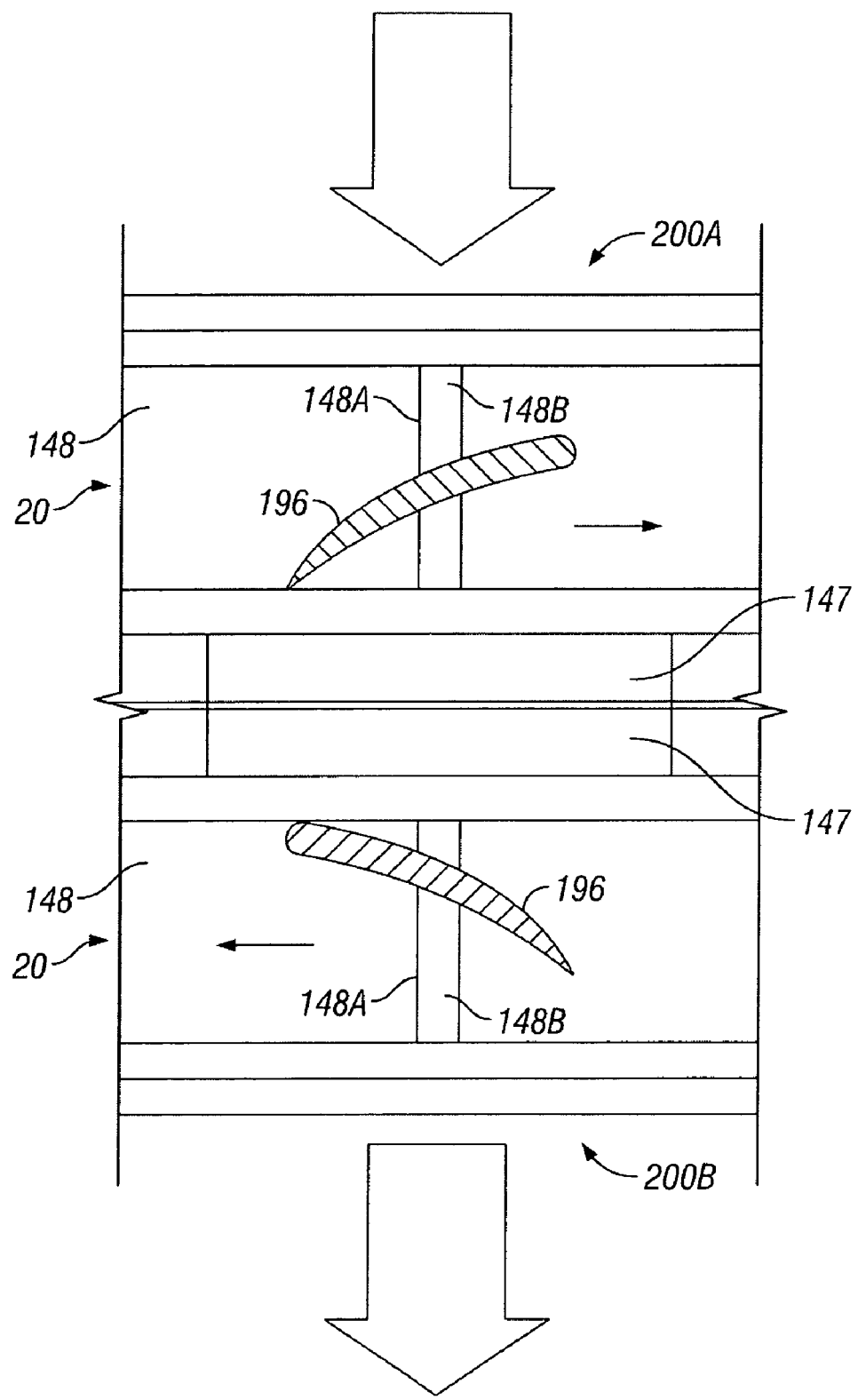
FIG. 6 is a partial sectional schematic diagram taken along line 4-4 in FIG. 4.

A pulsating direct current (PDC) is delivered, as shown, to the circuit of FIG. 5 so as to energize the stator levitation solenoids 149A, the tractor solenoids 147 and the control electromagnets 147A. Current is induced into the rotor electrical circuit including tractor coils 148A and rotor levitation solenoids 149. The control electromagnets 147A are variable amplitude controllable magnetic field devices placed in between each pair of tractor solenoids 147 which encircle the entire craft as the electrokinetic motor-generator stator and have as a main function to minimize the opposed polarity magnetic end effect developed in the empty space or gap in between each tractor's solenoid. By controlling the tractor solenoids end effect to a zero value eliminates a magnetic drag effect over the rotor, and hence enables a maximum thrust of the rotors 30R.

In normal operation, the upper and lower rotors 30R move in opposing rotational senses, and with identical rotational velocity. Synchronization is achieved by sensing actual rotational speed in both rotors 30R through the use of tachometer circuits within controllers 150 and adjusting current flow in solenoids 147 accordingly. The upper fan 196 draws air downwardly into the fuselage structure through an annular opening 200A (FIG. 6) above the upper fan 196. This air is expelled downwardly out of the fuselage through a second annular opening 200B below the lower fan 196. The annular openings 200A and 200B are in alignment with the fans 196 for relatively unobstructed vertical downward air flow. This air mass displacement produces upward thrust on the craft so that it is able to operate vertically in both directions depending upon the speed of the fans 196. It will be understood by those of skill in the art that simple rotation of the presently described aircraft about the craft's central vertical axis may be accomplished by changing the velocity of one of the two fans relative to the other.

The flying craft 10 is able to develop horizontal thrust. In the fuselage structure above the fans and annular opening 200A are preferably four independently operated braking flaps 195 (FIGS. 1, 2 and 4) spaced 90 degrees apart. When one or more of these flaps 195 are rotated to an engaged or elevated position, air flow into opening 200A adjacent to the elevated flap 195 is restricted and diminished. This causes lift at that point on the craft 10 to diminish resulting in that side of the craft tiling downwardly to a controllable degree. This causes the craft 10 develop a horizontal thrust vector proportional to the degree of tilt. Thus, within the service ceiling of the aircraft 10, a full array of aerodynamic control procedures is possible including vertical assent, descent, rotation in a horizontal attitude, tilting from the horizontal attitude and moving horizontally at a selected velocity.

Figure 7:
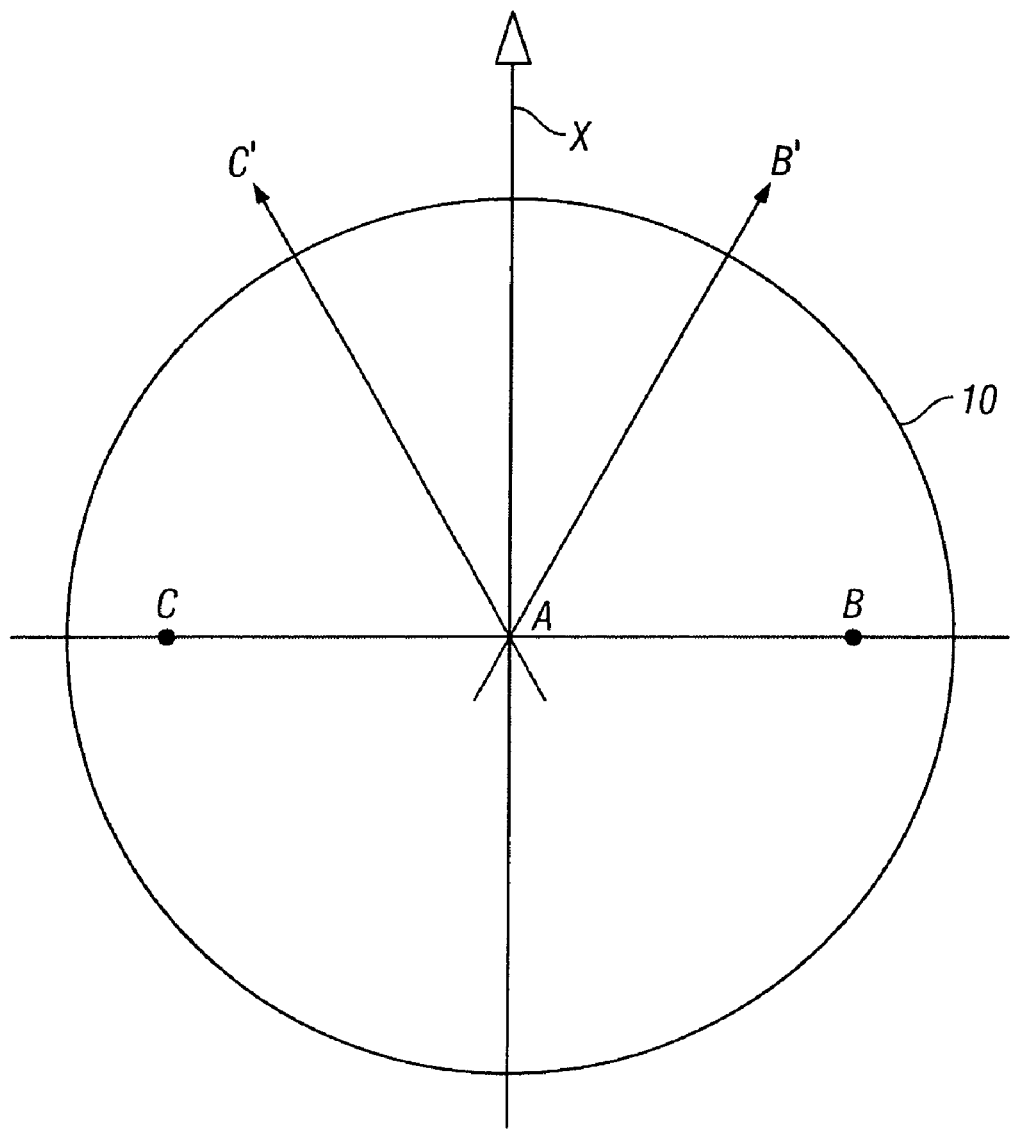
FIG. 7 is a conceptual diagram in plan view of the invention showing the manner in which inertial thrust may be developed.

The craft 10 is also able to operate above its aerodynamic service ceiling in an "inertial thrust mode," ITM. In ITM thrust is developed through manipulation of the inertial mass of rotors 30R. Referring now to FIG. 5, and assuming initial conditions where craft 10 is stationary and at rest relative to its own inertial frame; it has no external forces acting on it; it is symmetrical in both geometry and mass distribution about the axis of rotation "A" (FIG. 7) and the rotors 30R are magnetically levitated and rotating with identical velocities in opposing rotational senses. Thrust is generated in direction "X," shown in FIG. 7 by applying a braking force at location "B" to the rotor 30R that is rotating in the clockwise sense. This produces a force vector, see vector arrow B', exerted on craft 10 through its center of mass "A", so that with no other force applied to craft 10, craft 10 accelerates in the direction of vector B'. However, at the same time a second braking force is applied at location "C" to the rotor 30R that is rotating in the counter-clockwise sense. This produces a force vector shown by arrow C' exerted on craft 10 through its center of mass "A", so that with no other force applied to craft 10, it would accelerate in the direction of vector C'. Assuming now that points "B" and "C" are in positions that are located symmetrically with respect to direction "X," then the components of vectors B' and C' that are not along direction "X" are equal and in opposite directions so that they cancel each other out. The components of vectors B' and C' that are along direction "X" add, so that craft 10 receives a net force through its center of mass at point "A" and is therefore accelerated along direction "X." The breaking forces discussed above may be applied at any point around rotors 30R by a sudden and momentary reversal of current flow through solenoids 147 at the points "B" and "C". As shown in Fig. 5, when the upper rotor is braked, its controller 150 instantaneously reverses current flow in the upper solenoids 147, and likewise when the lower rotor is braked, its controller 150 instantaneously reverses current flow in lower solenoids 147. Controllers 150 may be provided for each blade circuit or one for each two blade circuits. Therefore, in summary, the craft 10 is able to operate as an inertial machine, that is, under control of inertial thrust. In order to change altitude, the craft 10 may be fitted with one or more, preferably four, electrokinetic directional thrusters 199 of similar construction as the main dual rotors 30R of the craft 10 but of a much smaller size, where each of said thrusters 199 is positioned within the craft 10, as shown in FIG. 2, or appended exteriorly to craft 10 and oriented relative to the craft 10 so as to produce a thrust vector resulting in a desired tilt of the craft's axis of rotation and once a tilt has been produced, inertial thrust vectors along line "X" are able to move the craft 10 in a desired direction.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A flying craft comprising:
    an aircraft structure supporting therein a twin pair of coaxially mounted electrokinetic motor-generators; each of the motors providing:
    a motor rotor providing a fan having radial fan blades, each of the fan blades terminating at opposing ends thereof with rotor levitation solenoids; the motor rotor further providing a plurality of tractor coils each fully embedded within one of a plurality of radial slots in a ferromagnetic material of the motor rotor, the slots and the tractor coils arranged in a circle in spaced apart positions on the motor rotor;
    a motor stator secured by a plurality of radially oriented struts, the struts engaging:
        a plurality of stator permanent magnet levitation solenoids, by position and orientation, electromagnetically interactive with the rotor permanent magnet levitation solenoids during rotation of the motor rotor;
        a plurality of tractor solenoids, by position and orientation, electromagnetically interactive with the tractor coils during rotation of the motor rotor;
        a plurality of intermediate end effect magnetic field control electromagnets at each side of the tractor solenoids, for controlling a magnetic end effect of the tractor solenoids; and
    an electrical power supply circuit providing a pulsed electrical current to the stator levitation solenoids and the tractor solenoids, the power supply circuit including a controller for synchronizing rotation between the pair of coaxially mounted motors.

2. The flying craft of claim 1 wherein the ferromagnetic material of each of the motor rotors is triangular in cross section; the tractor solenoids arranged in positions aligned with the radial slots in the ferromagnetic material.

3. The flying craft of claim 1 wherein the stator permanent magnet levitation solenoids and the rotor permanent magnet levitation solenoids are configured to provide a permanent mutual repulsive force directed lateral to the fan blades and simultaneously providing mutual repulsive forces directed longitudinally along the fan blades.

4. The flying craft of claim 1 further comprising an opening in the aircraft structure in registration with one of the fans for drawing air into the flying craft, and a further opening in the aircraft structure in registration with an other one of the fans for expelling the air.

* * * * *